July 7, 1953     J. C. McVICKER     2,644,716
DEFLECTOR PLATE
Filed July 21, 1950
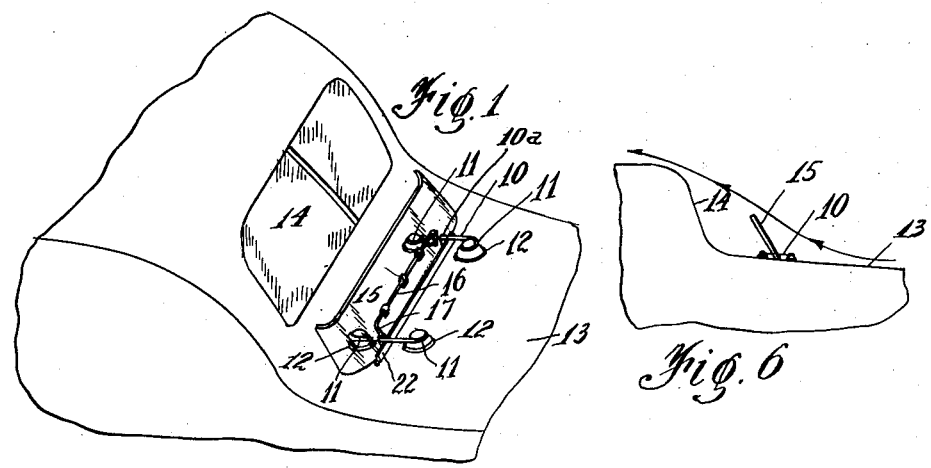
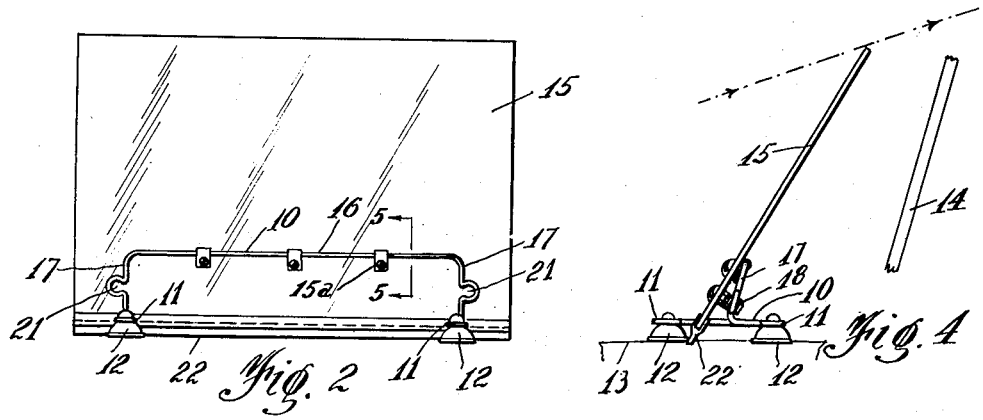
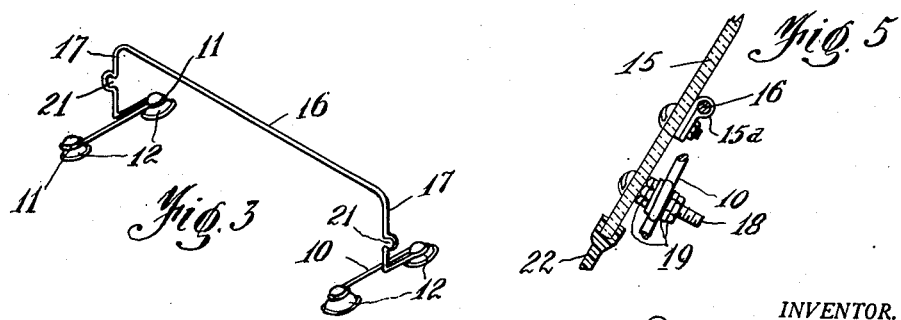
INVENTOR.
James C. McVicker,
BY Ralph Donath
Attorney.

Patented July 7, 1953

2,644,716

UNITED STATES PATENT OFFICE 2,644,716

DEFLECTOR PLATE

James C. McVicker, Ligonier, Pa.

Application July 21, 1950, Serial No. 175,083

1 Claim. (Cl. 296—91)

This invention relates to auxiliary windshields and more particularly to a removable windshield for keeping a windshield clear.

The difficulties experienced in maintaining clear vision through a windshield during or after a rain or snow storm are well-known and need but little discussion to point out the problem which is created. During the storm itself the splattering of the drops of rain on the windshield and the resulting multitude of small particles of water obstruct vision to a marked degree and after the rain has ceased the spatter of mud and water from the roads and streets by other vehicles forms a continuous hazard to vision. Many attempts have been made to solve the problem of reduced vision by reason of rain and mud spatter. The various forms of windshield wipers, sprays, etc. which have been suggested are not completely satisfactory since they must necessarily touch any particular spot only periodically as they sweep from side to side across the windshield. All of the methods of combatting the problem of restricted vision caused by rain, etc. are, so far as I know, based upon the principle of removing the rain or mud after it has reached the windshield.

The device of this invention is based upon preventing the materials which reduce or obstruct vision from reaching the windshield rather than removing it once it has gotten there.

In general, the device of this invention provides a frame adapted to be removably mounted on the hood of a vehicle in front of the regular windshield, an auxiliary windshield rotatable on this frame, means for adjusting the angular position of the auxiliary windshield with respect to the regular windshield, and resilient means on the bottom of the auxiliary windshield whereby contact between the vehicle hood and the auxiliary windshield is continuously maintained to produce with the hood a continuous air foil which carries the rain up and over the vehicle windshield.

The device of this invention will be more clearly understood by referring to the drawings in which Figure 1 is a fragmentary side elevation of the upper forward portion of an automobile with the device of this invention mounted on the hood thereof.

Figure 2 is a front elevation of the device of this invention.

Figure 3 is a perspective view of the mounting frame.

Figure 4 is an end elevation of the device of this invention.

Figure 5 is a fragmentary section on the line 5—5 of Figure 2.

Figure 6 is a diagrammatic view of a front portion of an automobile including the device of the invention and showing the direction of air-foil in chain lines and arrows.

Referring to the drawings there is illustrated a frame 10 having a pair of spaced apart openings 11 in which vacuum cups 12 or other suitable fastening means may be mounted. The frame 10 is mounted on the hood 13 or cowl in front of the ordinary windshield 14 by means of the vacuum cups 12. An auxiliary windshield 15 is rotatably mounted by means of clamping clips 15a on a shaft 16 which forms a part of the frame 10, raised above the level of the hood 13 by upright members 17 of the frame. The frame 10 passes through slots 10a in the auxiliary windshield so that the windshield itself can pass down to the vehicle hood. The height of this auxiliary windshield is so arranged that it does not project substantially above the line of sight from the driver to the vehicle front. An adjusting screw 18 at each side of the auxiliary windshield 15 threadingly engages a pair of nuts 19 on opposite sides of the openings 21 provided in the frame uprights 17. A resilient member 22 is fixed on the bottom of the auxiliary windshield 15 to close any gap which might exist between the hood 13 and the auxiliary windshield 14.

The operation of the device of this invention is as follows: The frame 10 is mounted on the hood 13 as shown in Figure 1 with the auxiliary windshield 15 spaced apart from and in front of the usual windshield 14. The angle of the auxiliary windshield 15 is adjusted by adjusting the screws 18 so as to form an airfoil surface which deflects the rain etc. upwardly and over the top of the vehicle so as substantially to miss the windshield as shown in Figures 4 and 6 in chain lines and arrows. The resilient member 22 serves to close any gap which might be created between the hood and auxiliary windshield and forms with the hood and auxiliary windshield a continuous unbroken deflecting surface. The height of the auxiliary windshield is made such that it does not project substantially above the line of sight (chain lines in Figures 4 and 6) from the driver to the front of the vehicle.

The effectiveness of the device of this invention appears to come from properly correlating the height of the auxiliary windshield with its relative angularity with respect to the hood and regular windshield and from the provision of a resilient member to close the gap between auxiliary windshield and hood so as to form a substantially continuous air foil.

While there is illustrated and described a preferred embodiment of this invention, it is to be understood that it may be otherwise embodied within the scope of the following claim.

I claim:

A device for preventing rain and the like from reaching a vehicle windshield comprising a frame including base members adapted to be removably attached to the hood of a vehicle in front of and spaced apart from the windshield, a pair of spaced apart uprights extending from the base members on either side of the hood, a fixed shaft connecting the uprights, an auxiliary windshield rotatably mounted on said shaft, means engaging said auxiliary windshield and the uprights on the frame for controlling the rotation of the windshield and resilient means on the bottom of said auxiliary windshield extending therefrom to contact the hood and form an air foil with the auxiliary windshield.

JAMES C. McVICKER.

References Cited in the file of this patent

UNITED STATES PATENTS

| Number | Name | Date |
|---|---|---|
| 1,204,122 | Bowman | Nov. 7, 1916 |
| 1,697,502 | Groenenstein | Jan. 1, 1929 |
| 2,220,715 | Heintz | Nov. 5, 1940 |
| 2,338,199 | Parke | Jan. 4, 1944 |
| 2,519,222 | Brooks | Aug. 15, 1950 |